United States Patent [19]

Robertson et al.

[11] 4,386,541
[45] Jun. 7, 1983

[54] TOOL FOR STRIPPING PLASTICS COATINGS FROM OPTICAL FIBRES

[75] Inventors: Alexander J. Robertson, Hoddesdon; Colin Shutt, Leeds, both of England

[73] Assignee: International Standard Electric Corporation, New York, N.Y.

[21] Appl. No.: 238,870

[22] Filed: Feb. 27, 1981

[30] Foreign Application Priority Data

Nov. 4, 1980 [GB] United Kingdom ............... 8035349

[51] Int. Cl.³ .............................................. H02G 1/12
[52] U.S. Cl. ................................... 81/9.5 R; 30/90.1; 30/116
[58] Field of Search ............... 81/9.5 R, 9.5 B, 9.5 C, 81/9.51; 30/116, 117, 90.1; 29/403.1, 403.3, 403.4; 294/26, 106, 118; 43/86

[56] References Cited

U.S. PATENT DOCUMENTS 1,180,339  4/1916  Takita ..................... 43/86
1,566,297  12/1925  Williams ................. 81/9.5 R X
3,665,602  5/1972  Salahshourian ........... 30/116 X
3,931,672  1/1976  Siden ..................... 30/90.1 X

FOREIGN PATENT DOCUMENTS 563664  8/1944  United Kingdom ........... 81/9.51

Primary Examiner—Stephen G. Kunin
Assistant Examiner—Debra S. Meislin
Attorney, Agent, or Firm—John T. O'Halloran; Robert P. Seitter

[57] ABSTRACT

A pair of interlocking single filament or multifilament loops (6,7) are mounted on the opposed operating ends (4,5) of a pliers action type hand tool. An aperture is formed between the two loops through which an optical fibre (31) complete with soft plastics primary coating (32) is inserted. The loops are tensioned by operation of the tool, and while this tension is maintained the fibre is removed causing the coating to be stripped off by the tightened loops.

8 Claims, 7 Drawing Figures

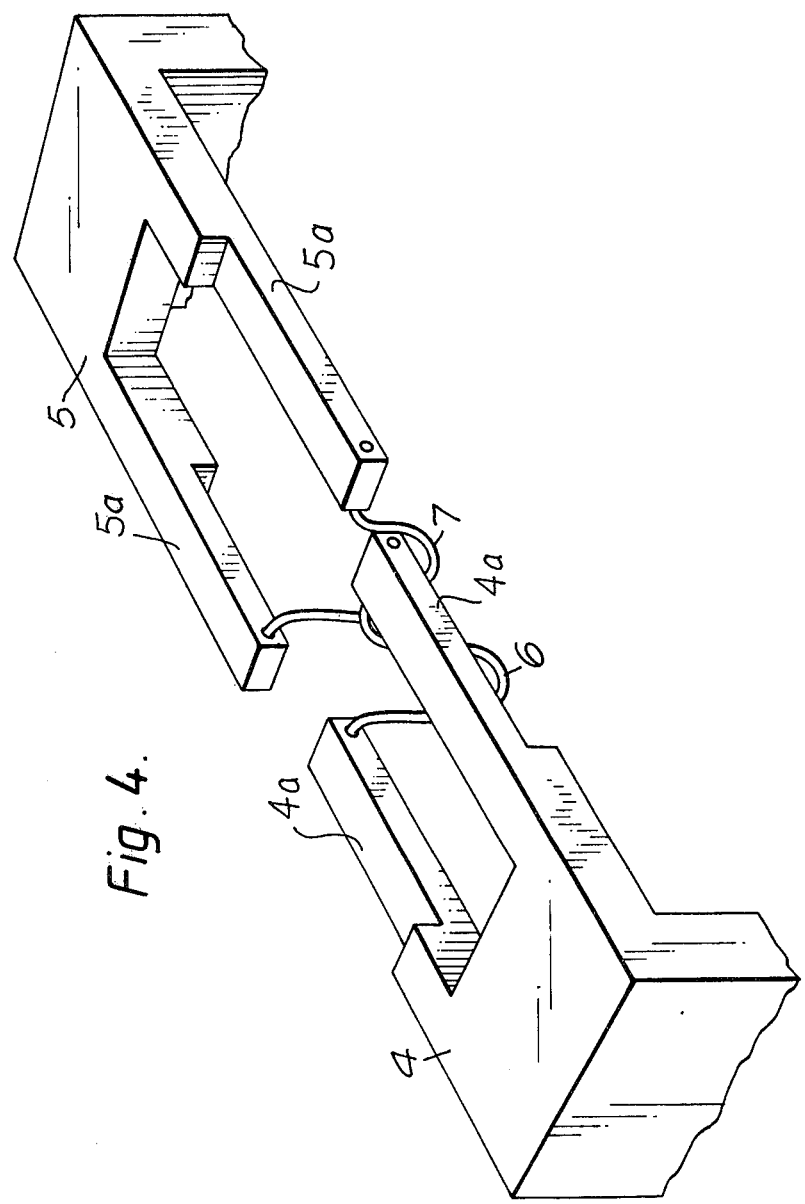

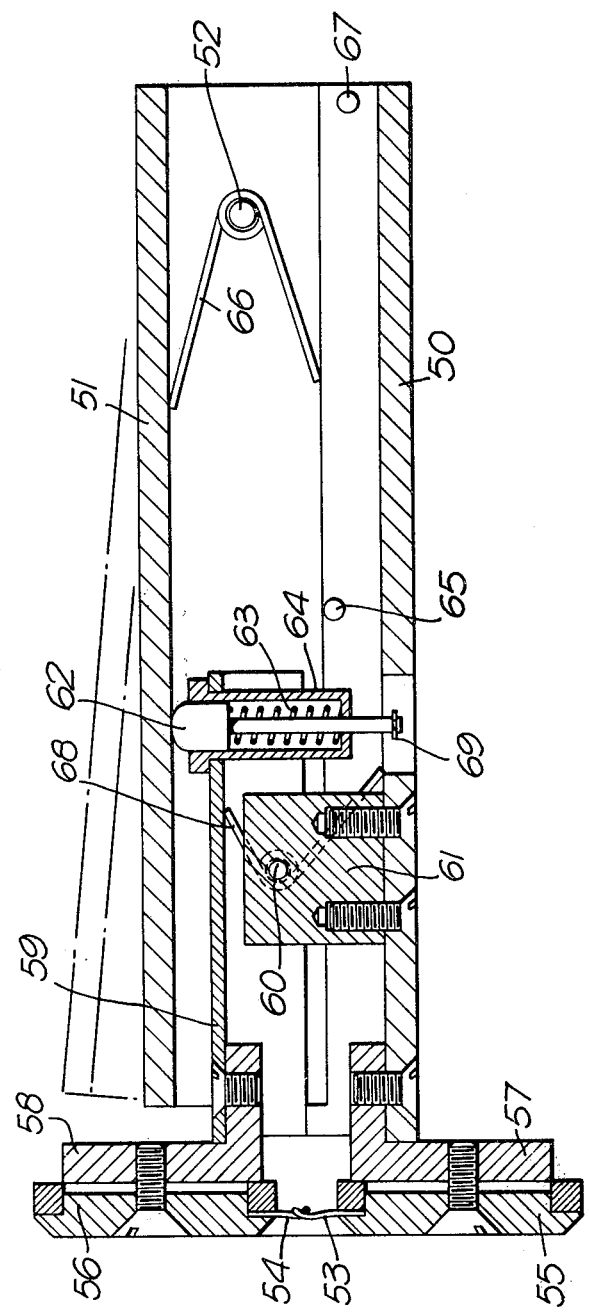

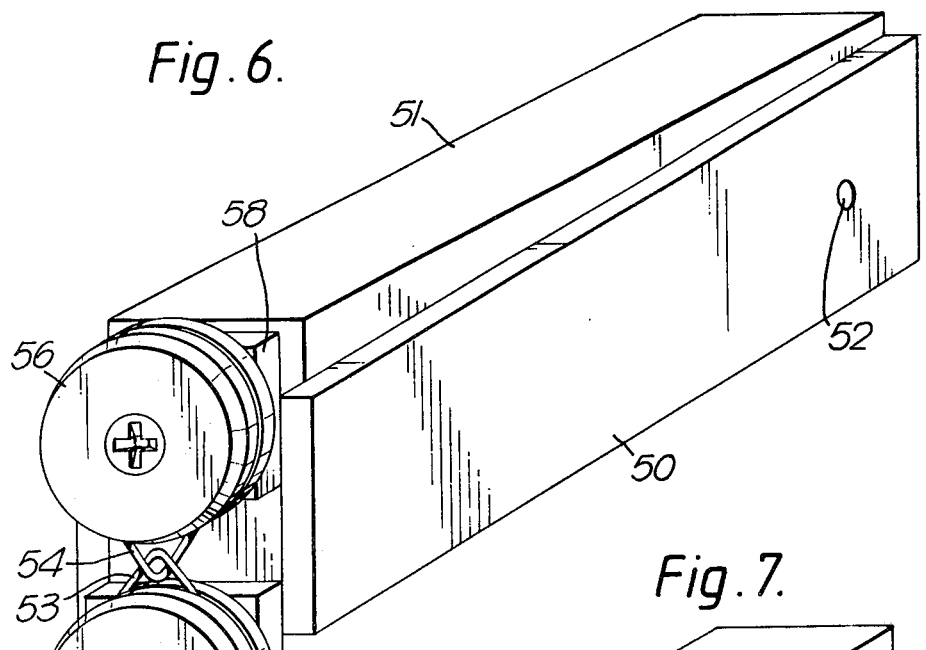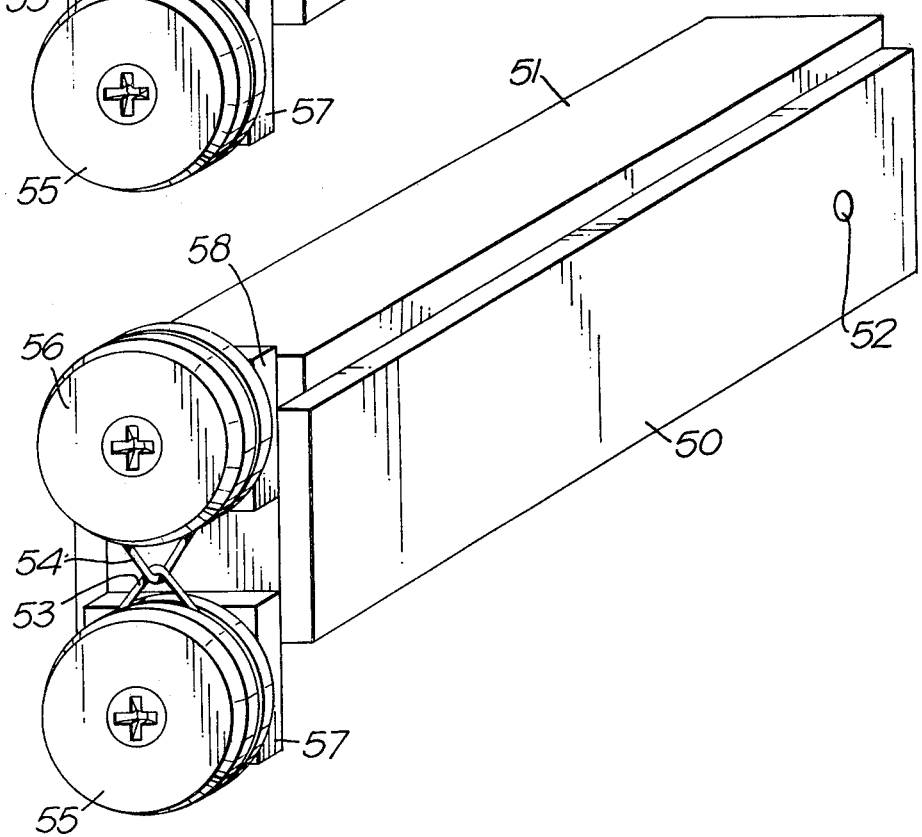

TOOL FOR STRIPPING PLASTICS COATINGS FROM OPTICAL FIBRES

This invention relates to a tool for stripping a soft plastics primary coating from a glass optical fibre of the type that is provided first with a relatively thin soft primary coating and then later with a thicker harder secondary plastics coating to provide mechanical protection.

A typical optical fibre of this type has a diameter of 125 microns. The primary coating thickness is about 40 microns, and the secondary about 400 microns. The primary coating is typically a silicone resin such as that marketed by Dow Corning under the designation Sylgard 182, while the secondary coating is typically a polyamide resin.

With fibre of this type the secondary coating can conveniently be stripped with wire strippers of a conventional design. The use of such strippers can not normally be relied upon entirely to remove the primary coating, and in many instances leaves the primary coating intact. However in the manufacture of many types of connectors and splices it is necessary to have this primary coating removed.

Previously it has been suggested that the primary coating can be removed by dipping the fibre end into an acid or other suitable solvent. Mechanical methods have also been attempted using metallic scraper elements. An alternative approach has been to form a loose overhand knot in a suitable fine filament, pass the optical fibre through the loop in the knot, draw the knot tight and then drag it off the end of the fibre drawing the primary coating with it. The present invention concerns a hand tool developed from this last-mentioned approach.

According to the present invention there is provided a hand tool for stripping a primary plastics coating from a glass optical fibre which tool has a pair of pivoted jaws each supporting a loop of filamentary material, which jaws are movable such that the loop of each jaw may be tensioned by the loop of the other.

BRIEF DESCRIPTION OF THE DRAWINGS

There follows a description of hand tools embodying the present invention in preferred forms. The description refers to the accompanying drawings in which:

FIGS. 3 and 4 depict alternative configurations of loops for the tools of FIGS. 1 and 2, FIG. 5 depicts a longitudinally sectioned view of a further alternative form of tool, and FIGS. 6 and 7 depict perspective views of the tool of FIG. 5 in the released and operated positions respectively.

DETAILED DESCRIPTION OF THE PREFERRED EMBODIMENT(S)

A convenient format for the hand tool is that of a pair of pliers. Such pliers may have the conventional crossover form depicted in FIG. 1, in which a squeezing together of the two handles 10, 11 causes the jaws 12, 13 to move together. Such a construction has the mechanical action of internal contracting-jaw pliers. Alternatively the tool may be as depicted in FIG. 2, and have the mechanical action of external expanding-jaw pliers in which a squeezing together of the two handles 20, 21 causes the jaws 22, 23 to move apart.

Figure 3:
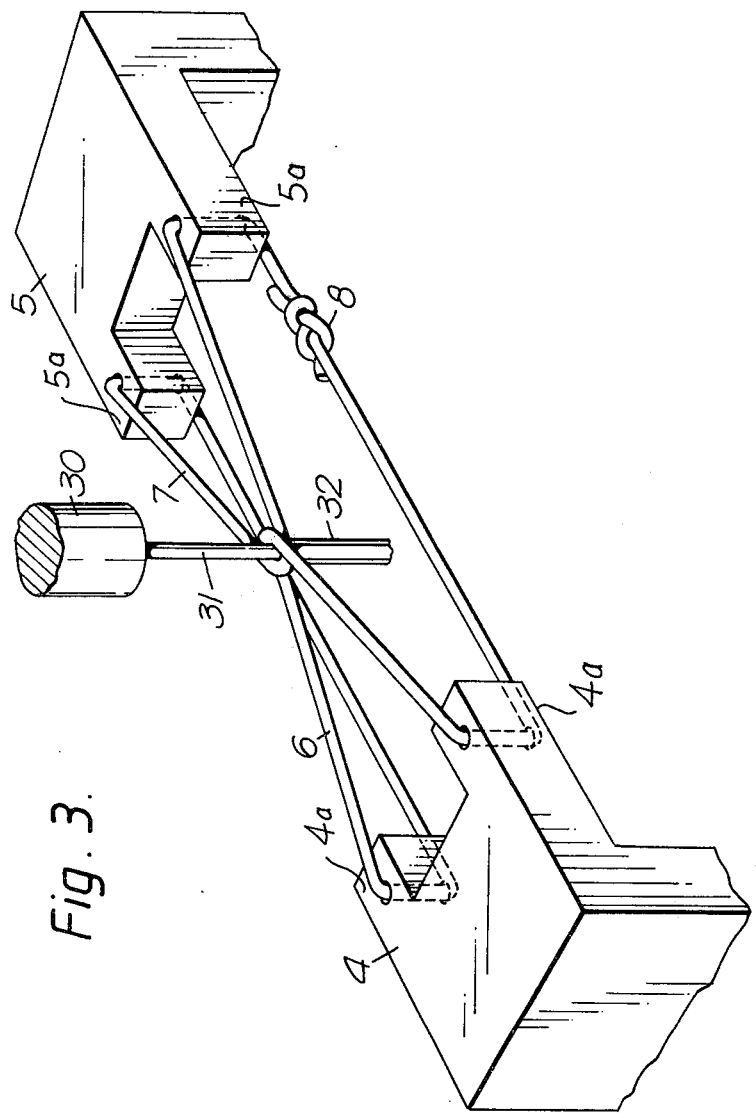

In each case the jaws have bifurcated ends 4, 5, each carrying a loop 6, 7 of filamentary material. Two basic loop configurations are possible. One is as depicted in FIG. 3 in which the two loops are permanently interlocked, and the other is as depicted in FIG. 4 in which the two loops are completely separable. In the case of the FIG. 3 configuration, the two loops can conveniently be made from a single length of the filamentary material knotted together at 8. This filamentary material may be a single filament or a multifilament strand. In the case of a single filament strand, a suitable source of material is polyamide fishing line. Polyamide fishing line having a breaking strain of about 2 kg and a nominal diameter of 0.18 mm was found satisfactory for stripping 125 micron diameter optical fibre. Similar line having a breaking strain of about 2.5 kg and a nominal diameter of 0.25 mm was found to be a little too large to give reliable results on this diameter of fibre, while the finer line having a breaking strain of only about 1 kg stripped the fibre well, but was a little too susceptible to breakage to be entirely satisfactory when subjected to rough handling. These results were obtained using the loop configuration as depicted in FIG. 3, and in which the length of the line was such that the angle between the two limbs of each loop was about 30°.

Referring again to FIG. 3 a portion of the secondary plastics coating 30 is removed from the end of a length of optical fibre to expose a portion of fibre 31 covered with a primary plastics coating 32. The secondary coating may conveniently be removed using wire strippers of conventional design. The ends 4, 5 of the jaws of the tool are moved inwardly so that loop 6 is released from engagement with loop 7. The stripped end of the fibre is next inserted through the aperture thus formed between the two loops, and then the jaws are moved outwardly to tighten the loops around the fibre immediately beneath the end of the secondary coating. Then, with the tension maintained, the exposed portion of the primary coating is stripped off the fibre by pulling the tool down off the fibre.

Figure 1:
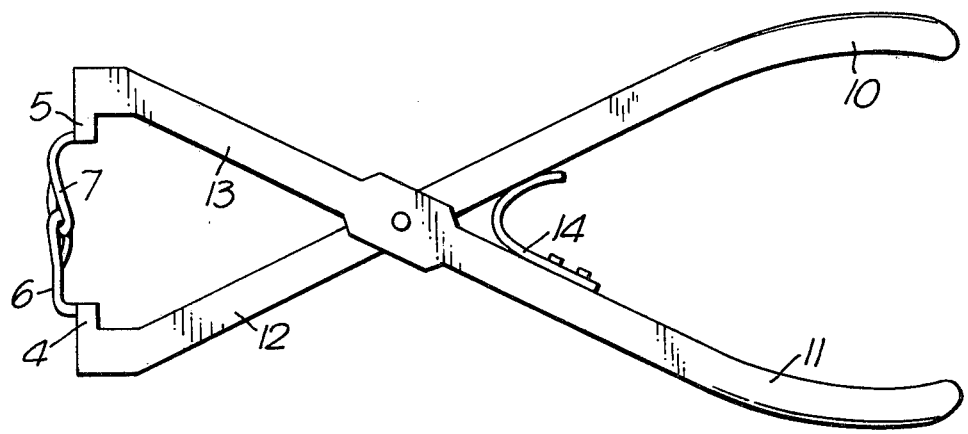
FIGS. 1 and 2 depict alternative forms of pliers-action tool.
Figure 2:
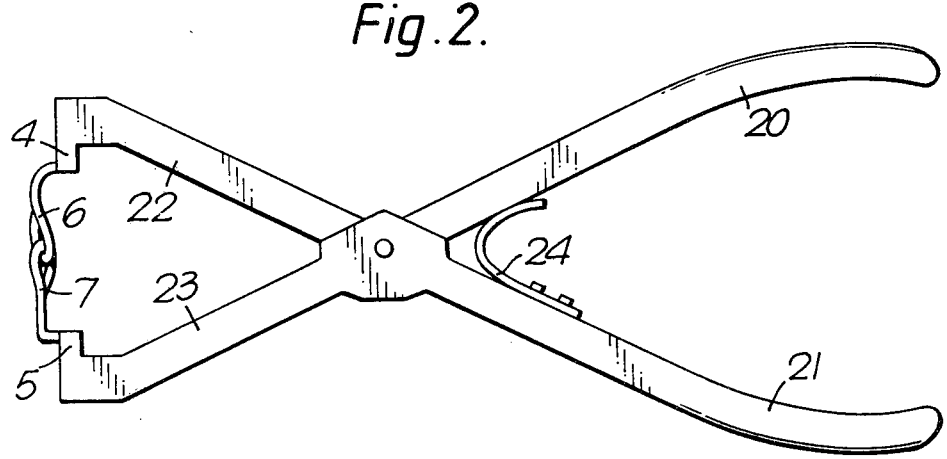

If the loop configuration of FIG. 3 is used in conjunction with pliers having an action of the type depicted in FIG. 1, the loops may be tensioned during the stripping operation by the action of a spring 14. This may be augmented by the operator gripping the handles in such a way that he is able to urge them apart. With pliers having the alternative type of action as depicted in FIG. 2 a spring 24 is optionally provided to bias the jaws together, and the loops are tensioned together by clenching the handles together against the action of the spring.

The loop configuration of FIG. 3 is easy to operate provided the filamentary material has sufficient stiffness so that when the jaws are moved together a well-defined aperture is formed between the two loops, The polyamide single filament fishing line referred to previously has been found to have quite adequate stiffness for this purpose.

If however a much more flexible material is used, such as for instance one of the multifilament aramid yarns sold by Dupont under the designation Kevlar, any problem of trying to thread the optical fibre end into an aperture formed between two interlocked loops may be avoided by adopting the loop configuration of FIG. 4. In this configuration the two loops are entirely separable, but are arranged to come together with one end of one loop engaged above the corresponding end of the other loop, and the other end of the first loop engaged beneath the corresponding other end of the other loop. With this configuration no threading of the optical fibre is required. The jaws are moved apart to disengage the two loops, the fibre is placed between the jaws, and then when the jaws are moved together again, the fibre automatically becomes trapped between the two loops. This configuration of loops may also be used either with the internal contracting-jaw type of pliers action tool depicted in FIG. 1 or with the external expanding-jaw type of pliers-action tool depicted in FIG. 2.

As clearly seen in FIGS. 3 and 4 of the drawing, the bifurcated ends 4 and 5 of the jaws 12 and 13 respectively are formed with finger portions 4a and 5a. Finger portions 4a are parallel to each other as are the finger portions 5a and the finger portions on each jaw are separated by a space. If desired, the finger portions 4a and 5a can be formed with reduced thickness portions, as illustrated in FIG. 4 so that opposing finger portions slide relative to each other as the jaw members are moved toward each other.

Referring now to FIGS. 5, 6 and 7 an alternative form of tool has its two jaws 50, 51 with a pivot 52 near one end. This tool has a pair of interlocking plastics filamentary loops 53, 54 secured in interlocking relationship in two-part clamping bobbins 55, 56 to backing plates 57, 58. The two jaws have a U-shaped cross-section, with one nesting in the other. Backing plate 57 is secured directly to jaw 50, while backing plate 58 is secured to a tensioning arm 59 which also has a U-shaped cross-section. The tension arm is mounted on a pivot pin 60 held by a bracket 61 secured to jaw 50.

When the jaws of the tool are clenched together jaw 51 acts on the tension arm on the side of the pivot pin 60 remote from the bobbin 56 so that the clenching action causes the bobbins to move apart thereby tensioning the loops against each other. Jaw 51 acts on the tension arm via a mechanism which limits to a safe value the force that can be transmitted to the loops. The mechanism consists of a plunger 62 and spring 63 sliding in a tube 64. When the jaws are clenched together the relative movement is transmitted to the plunger. Initially this movement is transmitted in its entirety via the spring and tube to the tensioning arm, but when the tension in the loops reaches a certain value the spring 63 starts to collapse. After this any further build up of tension in the loops is restricted by progressive collapse of the spring until finally movement of the jaws is arrested by a limit stop pin 65.

In the released state the two jaws are urged apart by spring 66, the movement being limited by a limit stop pin 67. At the same time a further spring 68, acting between the tension arm 59 and the jaw 50, biasses the two bobbins 55, 56 towards each other so as to form the required aperture between the interlocking parts of the two loops. Movement of the plunger 62 under the action of spring 63 is arrested by a stop means in the form of a clip 69 coming to rest against the base of the tube 64.

We claim:

1. A hand tool for stripping a plastic coating from a glass optical fiber, said tool including a pair of pivoted jaw members movable toward and away from each other, each jaw having a bifurcated end so as to form a pair of generally parallel fingers separated by a space extending therefrom, the fingers of one jaw extending toward the fingers of the other jaw, the fingers on each jaw supporting some portion of filamentary fiber to form a loop such that a length thereof extends across the space separating the fingers, said length of said loops being such that they overlap each other and form an aperture for receiving an optical fiber and can be tensioned to grip the fiber when the jaws are moved relative to each other.

2. A hand tool as claimed in claim 1 wherein each loop is made of a single filament.

3. A hand tool as claimed in claim 1 wherein each loop is made of multifilamentary material.

4. A hand tool in accordance with claim 1 wherein the loops are interlocked with each other.

5. A hand tool in accordance with claim 1 wherein the loops are completely separable.

6. A hand tool in accordance with claim 1 wherein each said jaw is formed on a handle and wherein the handles are pivoted so that squeezing the handles together causes the jaws to move toward each other.

7. A hand tool in accordance with claim 1 wherein each said jaw is formed on a handle and wherein the handles are pivoted so that squeezing the handles together causes the jaws to move away from each other.

8. A hand tool in accordance with claim 1 wherein said finger portions are formed with reduced thickness portions so that opposing finger portions slide relative to each other as said jaw members are moved toward each other.

* * * * *